US011958560B1

(12) United States Patent
Gu

(10) Patent No.: US 11,958,560 B1
(45) Date of Patent: Apr. 16, 2024

(54) KIDS BICYCLE BALANCE TRAINING HANDLE

(71) Applicant: Haidong Gu, Pomona, CA (US)

(72) Inventor: Haidong Gu, Pomona, CA (US)

(73) Assignee: CYCLINGDEAL USA, INC., Montclair, CA (US)

( * ) Notice: Subject to any disclaimer, the term of this patent is extended or adjusted under 35 U.S.C. 154(b) by 0 days.

(21) Appl. No.: 18/078,061

(22) Filed: Dec. 8, 2022

(51) Int. Cl.
*B62J 11/00* (2020.01)
*F16B 2/06* (2006.01)

(52) U.S. Cl.
CPC .............. *B62J 11/00* (2013.01); *F16B 2/06* (2013.01)

(58) Field of Classification Search
None
See application file for complete search history.

(56) References Cited

U.S. PATENT DOCUMENTS 9,051,016 B2 * 6/2015 Boger .................. B62H 7/00

FOREIGN PATENT DOCUMENTS

CN 2197290 Y * 5/1995

* cited by examiner

*Primary Examiner* — Vicky A Johnson

(57) ABSTRACT

A kids bicycle balance training handle is provided, including a fastening base, a handle bar, and a grip cover. The fastening base includes a handle clamp portion and a seat-post clamp portion. The handle clamp portion and the seat-post clamp portion are arranged opposite to each other. The seat-post clamp portion is movably clamped on and fixed to a seat post of a bicycle. The handle clamp portion is movably clamped on and fixed to a fixed section of the handle bar. The handle bar includes the fixed section and a sleeved section, and the fixed section is arranged non-coaxially with respect to the sleeved section. The grip cover is sleeved on an outer surface of the sleeved section. The seat-post clamp portion can be clamped on an outer surface of the seat post, and the handle clamp portion can be clamped on the handle bar.

12 Claims, 10 Drawing Sheets

KIDS BICYCLE BALANCE TRAINING HANDLE

FIELD OF DISCLOSURE

The present invention relates to a handle installed on a seat post of a bicycle to help children practice riding a bicycle.

DESCRIPTION OF RELATED ART

When children can control movement of their limbs in development stages, so they can be trained to ride a bicycle. Riding a bicycle requires the coordination of balance, control, and stability, and improves children's divided attention by making them pay attention to the road conditions and surrounding sounds to judge how to change the movement of their hands and feet.

When children practice riding a bicycle, it is required to help them know a position of each part of the bicycle at the beginning, and gradually teach them how to balance, pedal, adjust driving speed, ride along a path, bypass obstacles, and etc.

At present, patents associated with assisting/training children to ride bicycles are U.S. Pat. Nos. 5,683,093A and 5,791,675A. Any of the above-mentioned accessories is installed on a frame and extends to the rear of a bicycle, so that a trainer can hold it from behind or one side of the bicycle to teach a child to ride a bicycle.

In addition to that, there are bike accessories installed on the seat post of the bicycle, such as the products sold on web sites https://reurl.cc/QW9vo0 and https://reurl.cc/VRedMY. These accessories are mainly installed on the seat posts and disposed close to positions below seat cushions, which causes inconvenience to adjust heights and easily causes undesired radial rotation with respect to the seat posts when the accessories are in use.

SUMMARY OF THE DISCLOSURE

The present invention provides a kids bicycle balance training handle, including: a fastening base, a handle bar, and a grip cover; wherein the fastening base includes a handle clamp portion and a seat-post clamp portion, the handle clamp portion and the seat-post clamp portion are disposed opposite to each other, the seat-post clamp portion is movably clamped on and secured to a seat post of a bicycle, and the handle clamp portion is movably clamped on and secured to a fixed section of the handle bar; wherein the handle bar includes the fixed section and a sleeved section, and the fixed section is arranged non-coaxially with respect to the sleeved section; and wherein the grip cover is sleeved on an outer surface of the sleeved section.

When the present invention is in use, the seat-post clamp portion can be clamped on and fixed to an outer surface of the seat post of the bicycle, and the handle clamp portion can be clamped on and fixed to the handle bar. As a result, it is convenient for a user to adjust positions bidirectionally according to needs. Moreover, by means of bidirectional fixation to the seat post and the handle bar, it is not easy to cause undesired radial rotation with respect to the seat post during use.

DETAILED DESCRIPTION OF EMBODIMENTS

Figure 1:
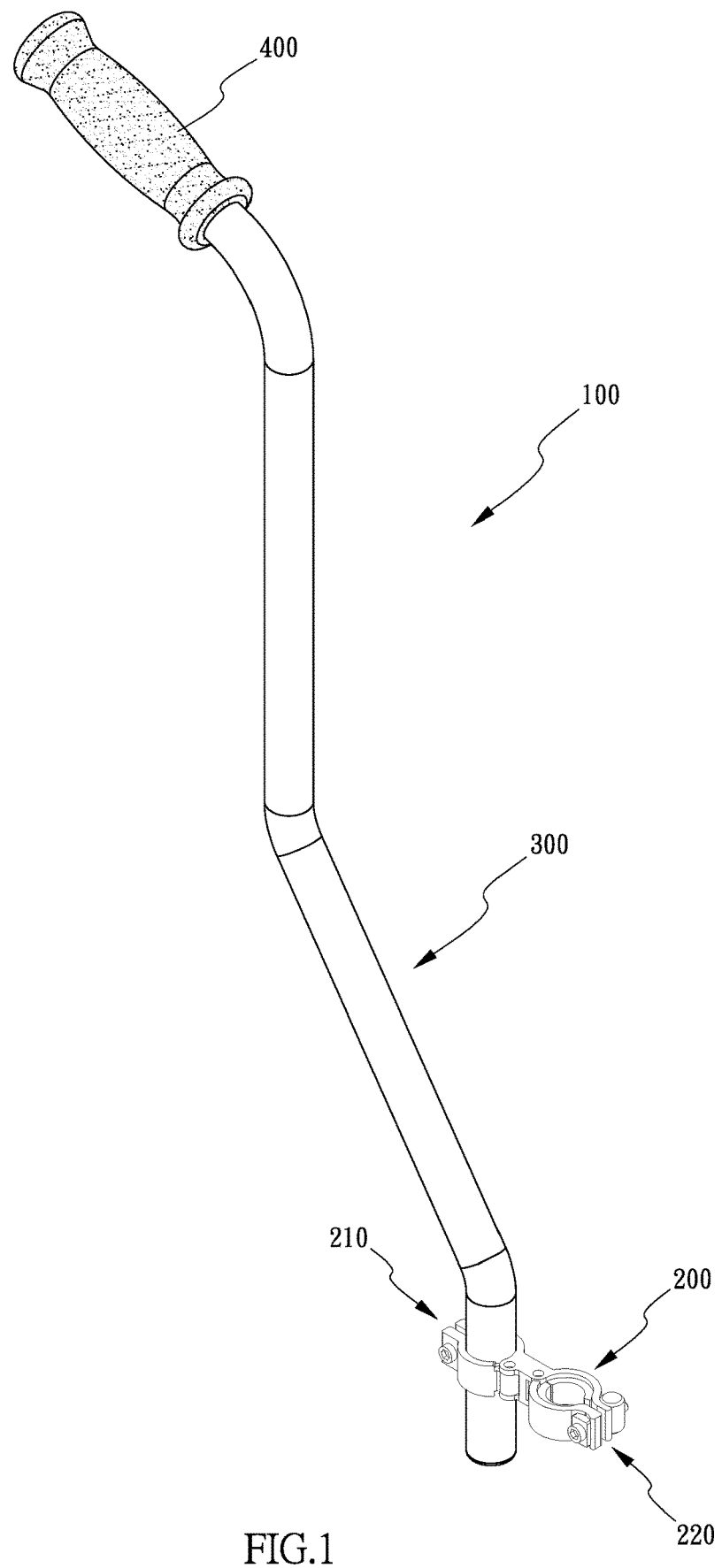
FIG. 1 is a perspective assembled view of the present invention.
Figure 2:
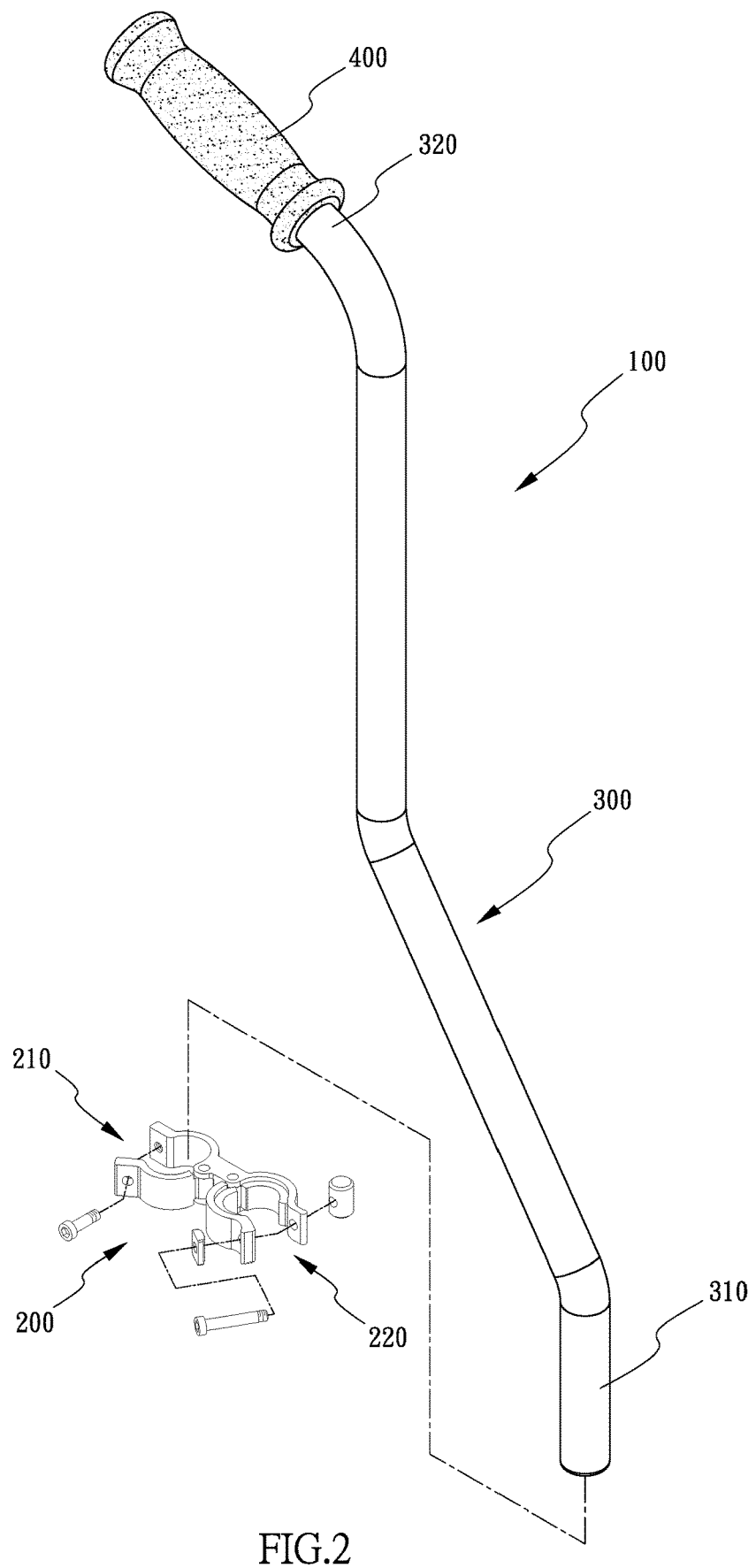
FIG. 2 is a perspective exploded view of the present invention.
Figure 3:
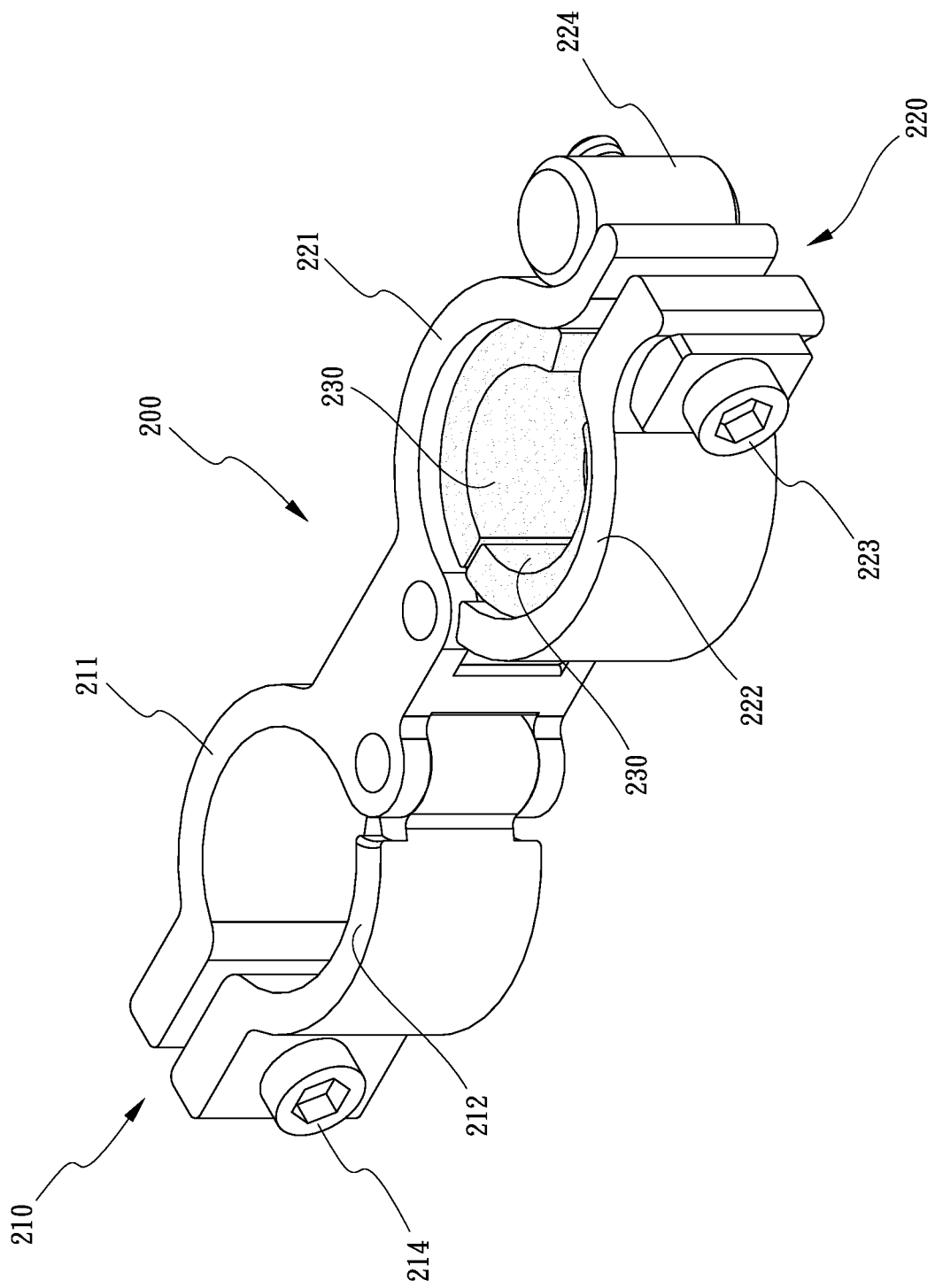
FIG. 3 is a perspective view of a fastening base of the present invention. (in an assembled state)
Figure 4:
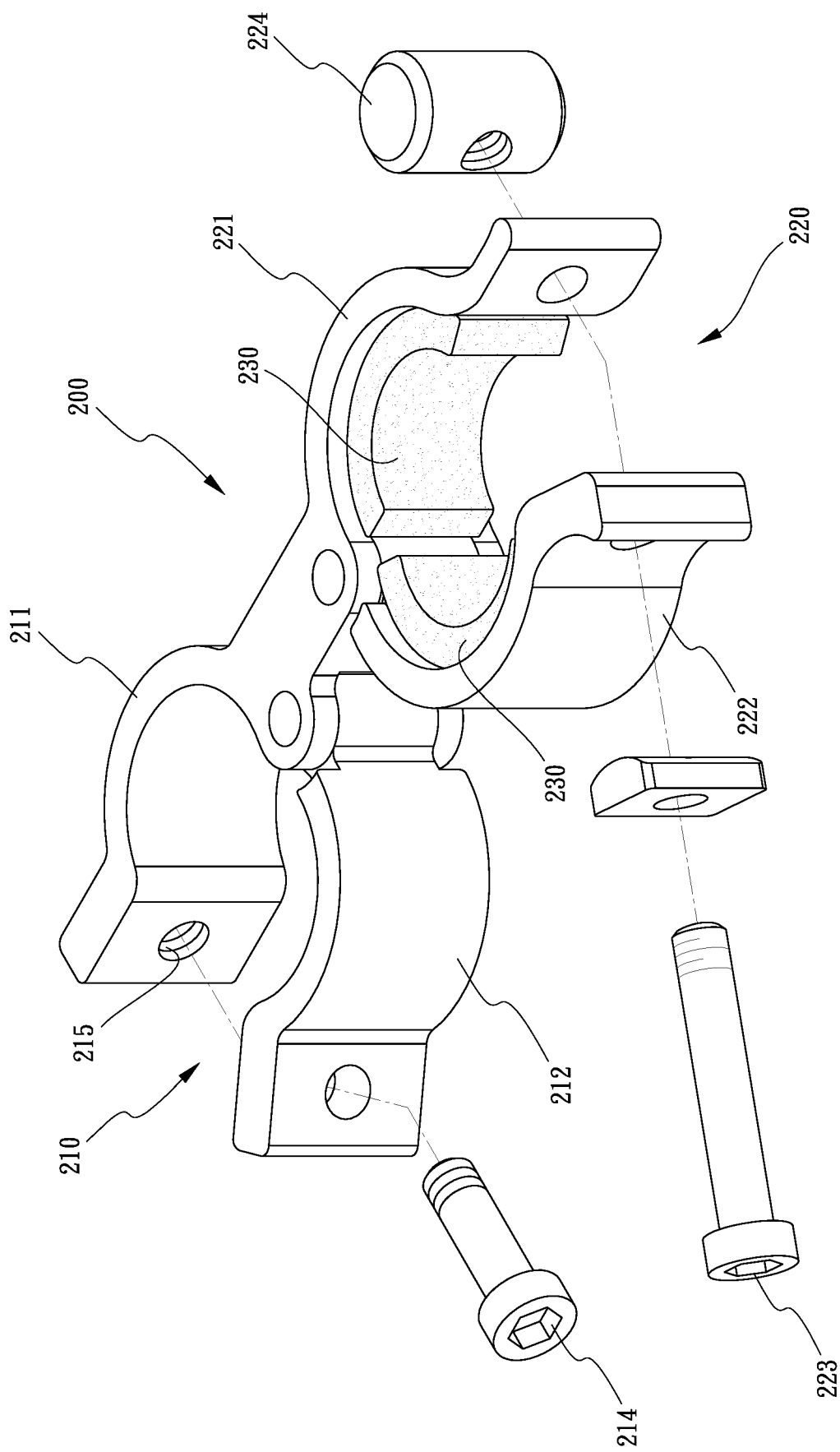
FIG. 4 is a perspective view of the fastening base of the present invention. (in an open state)
Figure 5:
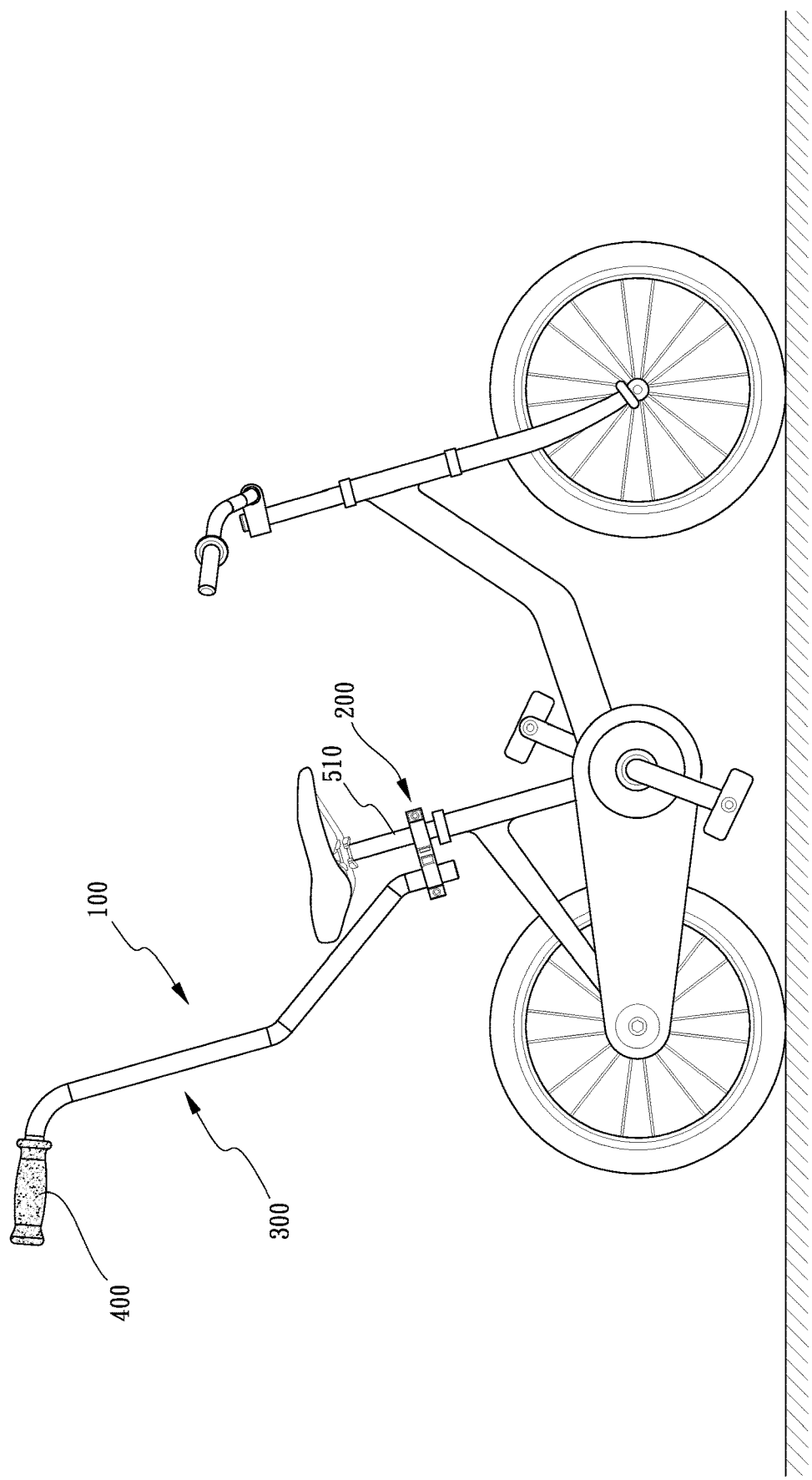
FIG. 5 is a schematic side view of the present invention when installed on a bicycle.
Figure 6:
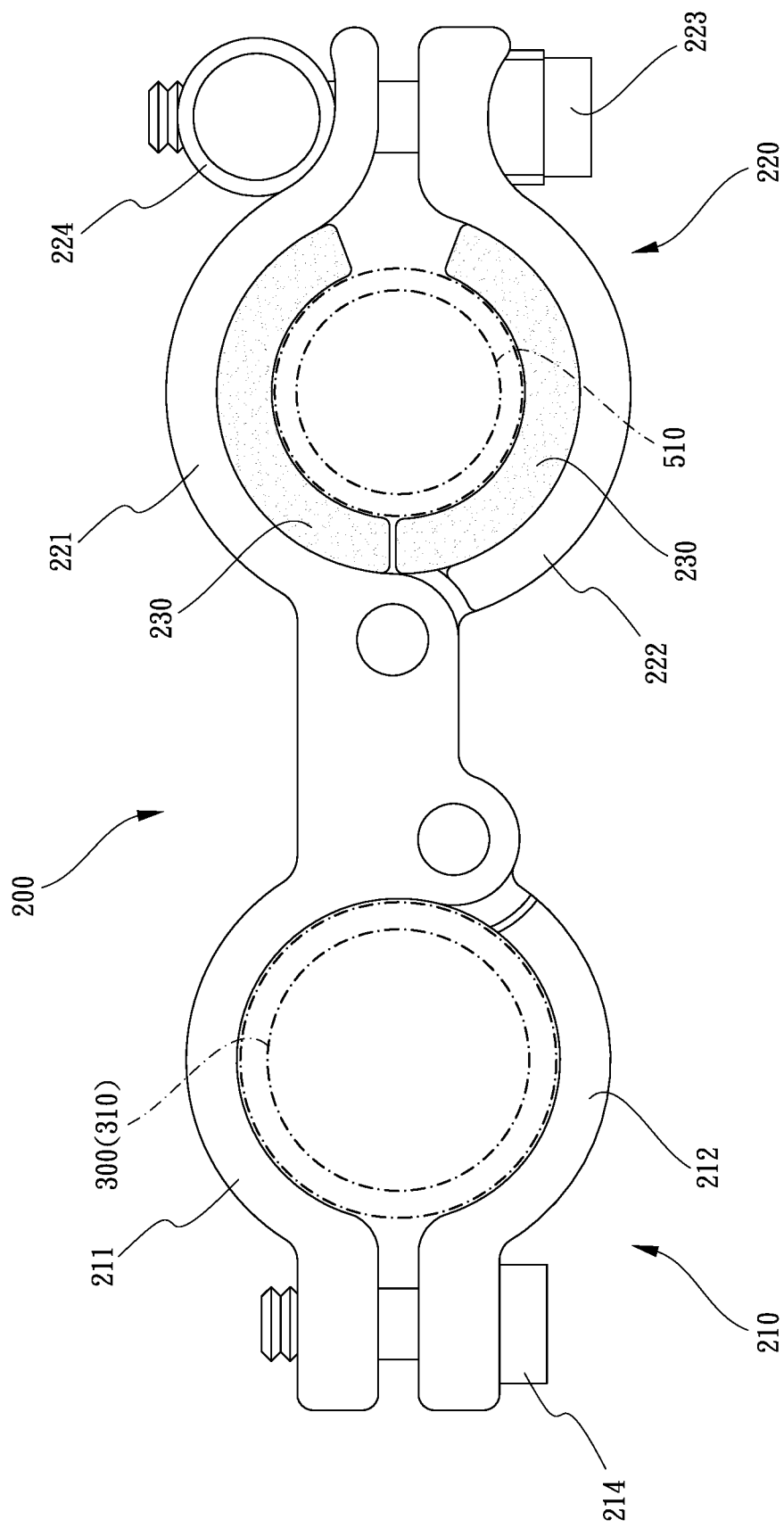
FIG. 6 is a schematic plan view of the present invention assembled and clamped on a seat post.

Please refer to FIGS. 1 to 6, which show a kids bicycle balance training handle 100, which includes a fastening base 200, a handle bar 300, and a grip cover 400, wherein the fastening base 200 includes a handle clamp portion 210 and a seat-post clamp portion 220, the handle clamp portion 210 and the seat-post clamp portion 220 are disposed opposite to each other, the seat-post clamp portion 220 is movably clamped on and fixed to a seat post 510 of a bicycle, and the handle clamp portion 210 is movably clamped on and secured to a fixed section 310 of the handle bar 300; wherein the handle bar 300 includes the fixed section 310 and a sleeved section 320, and the fixed section 310 is arranged non-coaxially with respect to the sleeved section; and wherein the grip cover 400 is sleeved on an outer surface of the sleeved section 320.

When the present invention is in use, the seat-post clamp portion 220 can be clamped on and fixed to an outer surface of the seat post 510 of the bicycle, and the handle clamp portion 210 can be clamped on and fixed to the handle bar 300. Accordingly, it is convenient for a user to carry out a bidirectional position adjustment according to needs. Moreover, by means of bidirectional fixation to the seat post 510 and the handle bar 300, undesired radial rotation with respect to the seat post 510 is less likely to occur during use. When a child is riding a bicycle, a trainer can hold the present invention from behind or one side of the bicycle to help the child practice balancing while riding the bicycle.

The features of components of the present invention and their mutual assembly relationship are further described in detail.

The handle bar 300 includes a lower extension section 330 and an upper extension section 340. A lower end of the lower extension section 330 is connected to an upper end of the fixed section 310 in an integral form. A lower end of the upper extension section 340 is connected to an upper end of the lower extension section 330 in an integral form. An upper end of the upper extension section 340 is connected to the sleeved section 320 in an integral form. Through the above-mentioned multi-segment connection configuration, the handle bar 300 has better structural strength compared with a single tube configuration, thereby better resisting lateral deflection force resulting from children's poor balance when riding the bicycle.

Figure 7:
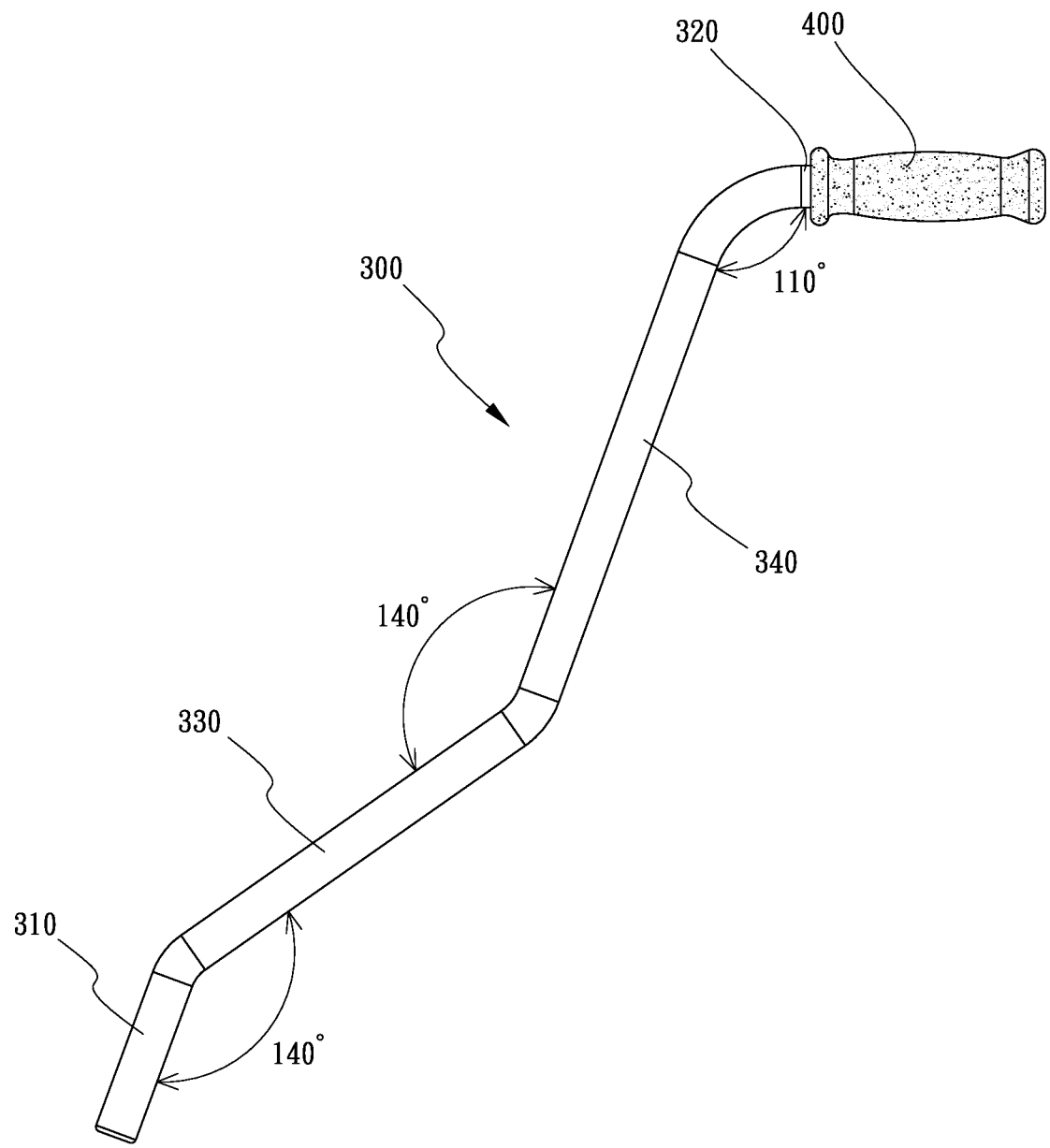
FIG. 7 is a side view of a handle bar.

Please refer to FIG. 7. An angle between the lower extension section 330 and the fixed section 310 is 140°. An angle between the lower extension section 330 and the upper extension section 340 is 140°. An angle between the upper extension section 340 and the sleeved section 320 is 110°. An axial length of the upper extension section 340 is greater than an axial length of the lower extension section 330. An axial length of the sleeved section 320 is greater than an axial length of the fixed section 310. The fixed section 310 and the upper extension section 340 are arranged in parallel and spaced apart. Through the above-mentioned configuration of the sections in length and angle, the handle bar 300 avoids contact with a child's body, and the upper extension section 340 is basically parallel to the seat post 510, which provides better operational stability than the prior art's straight bar structure. The sleeved section 320 is basically horizontal, and the grip cover 400 is fixed on the sleeved section 320. Therefore, the trainer can hold the grip cover 400 with one hand stretching forward, so the trainer can exert force comfortably without overly twisting the trainer's arm for manipulation, which is very ergonomic to ensure health, safety, and comfort.

The handle bar 300 is made of chrome molybdenum steel in an integral form (not welded). The above-mentioned fastening base 200 is made of chromium molybdenum steel. Therefore, the handle bar 300 and the fastening base 200 have a good strength-to-weight ratio.

The seat-post clamp portion 220 comprises a seat fixing fastener 221 and a seat swing fastener 222. The seat swing fastener 222 is moved toward or away from the seat fixing fastener 221, and a seat-post bolt 223 is used to be inserted through the seat fixing fastener 221 and the seat swing fastener 222 to be threadedly connected to a seat-post nut 224, so that the seat fixing fastener 221 and the seat swing fastener 222 are clamped on and fixed to the outer surface of the seat post 510. The handle clamp portion 210 includes a handle fixing fastener 211 and a handle swing fastener 212. The handle swing fastener 212 is moved toward or away from the handle fixing fastener 211. A handle bolt 214 is configured to be inserted through the handle swing fastener 212 to be threadedly connected to a screw hole 215 of the handle fixing fastener 211, so that the handle fixing fastener 211 and the handle swing fastener 212 are fixed and clamped on the fixed section 310 of the handle bar 300. Through the above structure, the user only needs to use a hand tool to rotate the seat-post bolt 223 and the handle bolt 214 to adjust swung-open and swung-closed positions of the seat swing fastener 222 with respect to the seat fixing fastener 221 and to adjust swung-open and swung-closed positions of the handle swing fastener 212 with respect to the handle fixing fastener 211. Consequently, positions of the present invention can be adjusted with respect to the seat post 510 and the handle bar 300, and the present application can be fixedly clamped on the seat post 510 and the handle bar 300, so as to quickly and effectively reach an appropriate operating height for the trainer. The above-mentioned operating height refers to a position where the trainer stretches the trainer's arm forward to hold the grip cover 400.

It should be noted that a soft gasket 230 is arranged on an inner side of the seat fixing fastener 221 and an inner side of the seat swing fastener 222. The soft gasket 230 is arranged on the inner sides of the seat fixing fastener 221 and the seat swing fastener 222, so as to prevent the seat fixing fastener 221 and the seat swing fastener 222 from being directly clamped and fixed on the outer surface of the seat post 510 by making the soft gasket 230 contact the seat post 510 and arranging the soft gasket 230 between the seat fixing fastener 221 and the seat post 510 and between the seat swing fastener 222 and the seat post 510. Accordingly, the present invention prevents a surface of the seat post 510 from being scratched. The above-mentioned soft gasket 230 is made of a soft rubber material.

Figure 8:
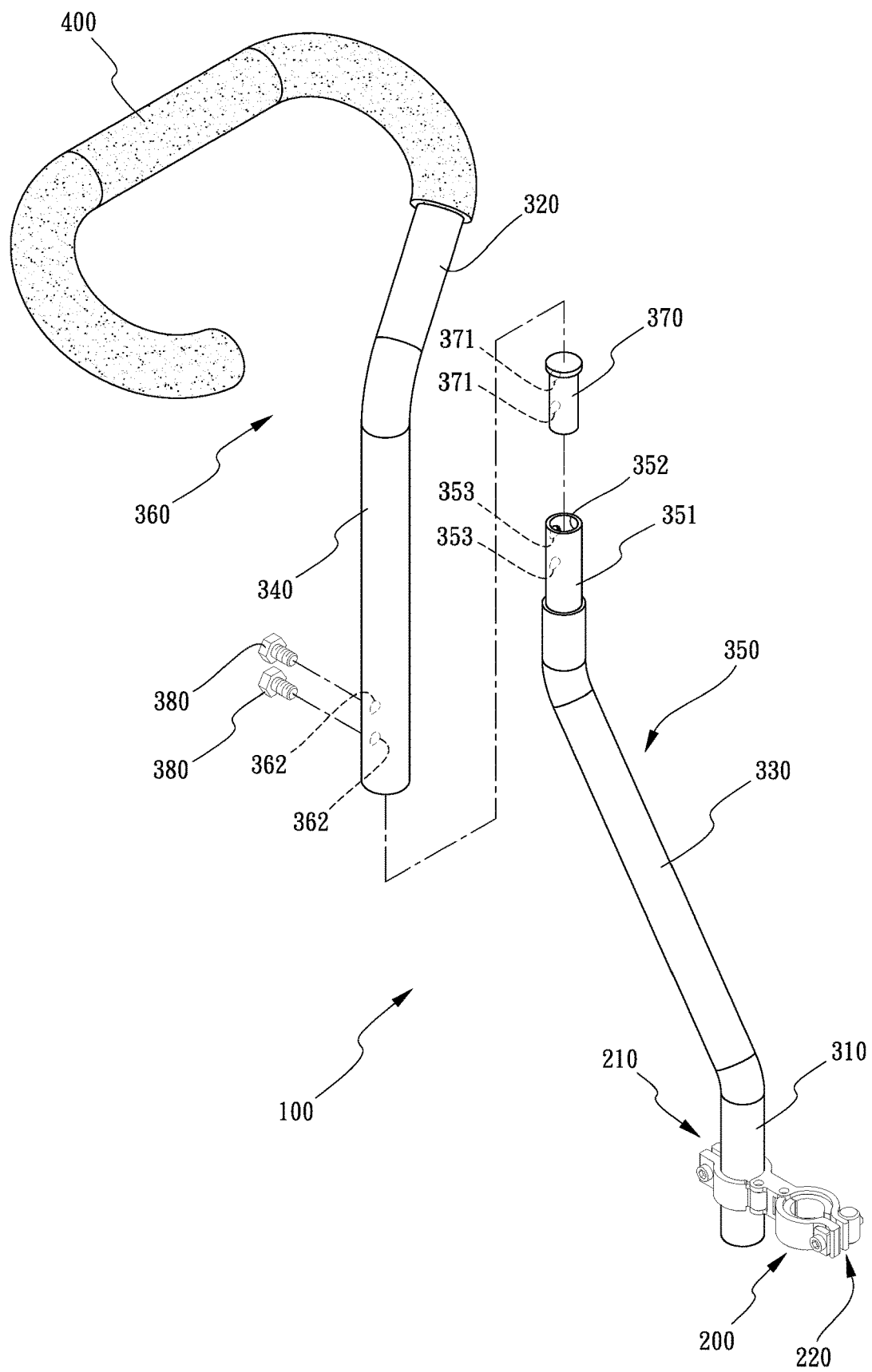
FIG. 8 is a partial exploded perspective view of the present invention according to a second embodiment.
Figure 9:
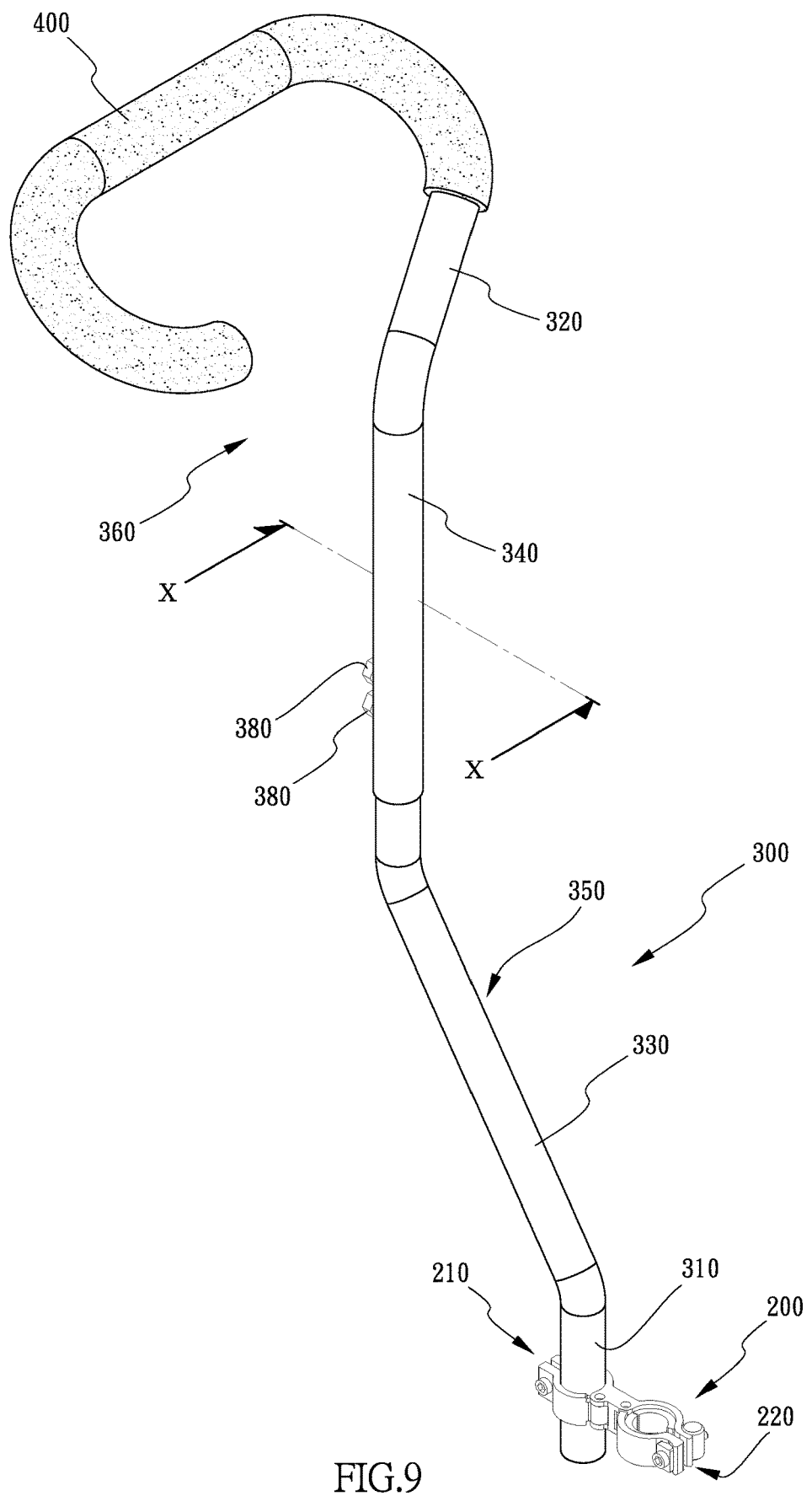
FIG. 9 is a perspective assembled view of the present invention according to the second embodiment.
Figure 10:
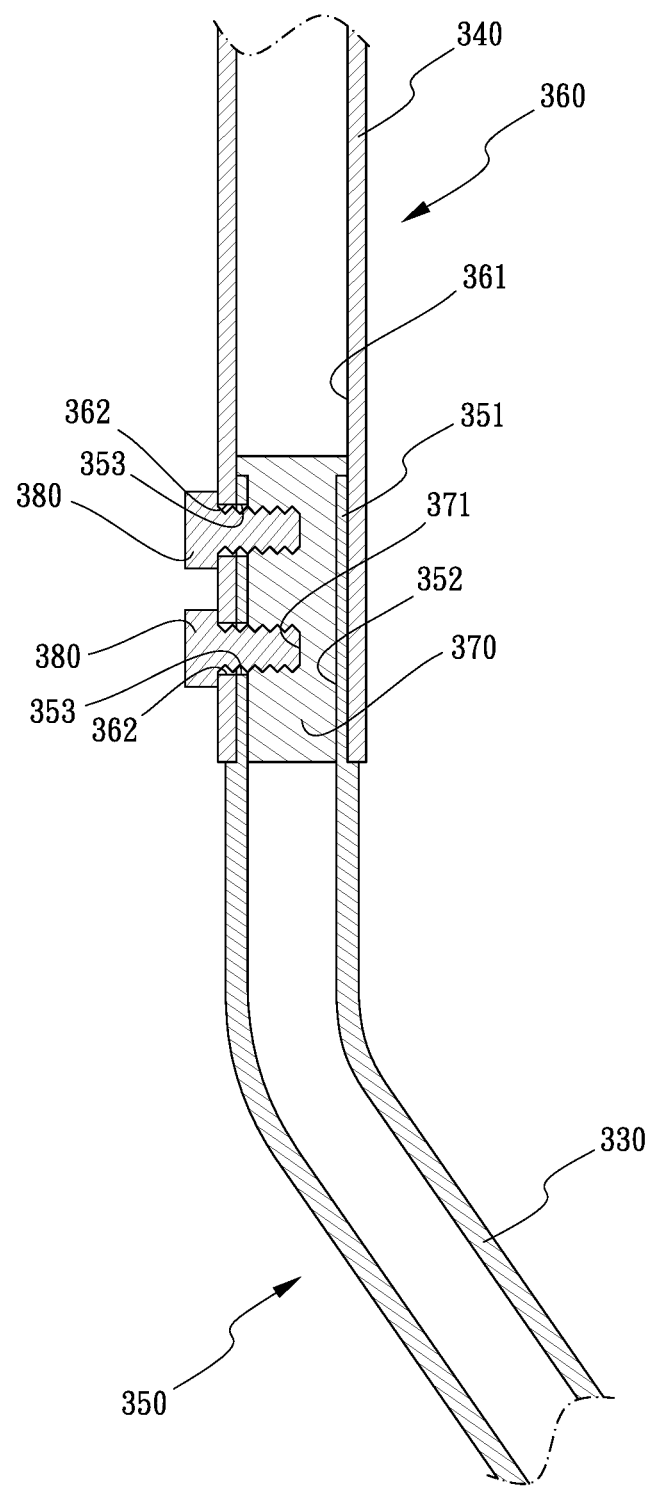
FIG. 10 is a schematic cross-sectional view taken long line X-X of FIG. 9.

Please refer to FIGS. 8 to 10 which are the kids bicycle balance training handle 100 according to a second embodiment of the present invention. The second embodiment is different from the foregoing embodiment mainly in the handle bar 300:

The handle bar 300 includes a lower part 350, an upper part 360, and an embedded part 370. The lower part 350 includes an insertion section 351, and the insertion section 351 is axially provided with an inner hole 352. The upper part 360 includes a receiving hole 361 for sleeving and fixing the insertion section 351. The embedded part 370 is partially disposed in the inner hole 352, and the embedded part 370 is partially disposed in the receiving hole 361. The fixed section 310 is located in the lower part 350, and the sleeved section 320 is located in the upper part 360. The present invention further includes a lateral bolt 380. The lateral bolt 380 is inserted through an upper lateral hole 362 of the upper part 360, a lower lateral hole 353 of the lower part 350, and an inner lateral hole 371 of the embedded part 370, so as to fix the upper part 360, the lower part 350, and the embedded part 370. The above-mentioned lower hole 353 is defined in an outer surface of the insertion section 351.

In the above collaborative structures, the handle bar 300 of the present embodiment is a combined assembly formed by the upper part 360 and the lower part 350. Compared with the one-piece type handle 300 of the foregoing embodiment, the present embodiment is very beneficial to be shipped/delivered disassembled in a small carton, and an overall structural strength is not reduced much.

In addition, the sleeved section 320 is bent in multiple sections and has a hook shape, so that the grip cover 400 also forms multiple bent sections when sleeved on the sleeved section 320, which is convenient for the user to hold with one hand or both hands for use and also prevents lateral slippage during use.

What is claimed is:

1. A kids bicycle balance training handle, comprising:
   a fastening base, a handle bar, and a grip cover;
   wherein the fastening base comprises a handle clamp portion and a seat-post clamp portion, the handle clamp portion and the seat-post clamp portion are disposed opposite to each other, the seat-post clamp portion is movably clamped on and secured to a seat-post of a bicycle, and the handle clamp portion is movably clamped on and secured to a fixed section of the handle bar;
   wherein the handle bar comprises the fixed section and a sleeved section, and the fixed section is arranged non-coaxially with respect to the sleeved section;
   wherein the handle clamp portion comprises a handle fixing fastener and a handle swing fastener, the handle swing fastener is moved toward or away from the handle fixing fastener, and a handle bolt is configured to be inserted through the handle swing fastener to be threadedly connected to a screw hole of the handle fixing fastener, so that the handle fixing fastener and the handle swing fastener are clamped on and fixed to the fixed section of the handle bar; and
   wherein the grip cover is sleeved on an outer surface of the sleeved section.

2. The kids bicycle balance training handle according to claim 1, wherein the handle bar comprise a lower extension section and an upper extension section, a lower end of the lower extension section is connected to an upper end of the fixed section in an integral form, a lower end of the upper extension section is connected to an upper end of the lower extension section in an integral form, and an upper end of the tipper extension section is connected to the sleeved section in an integral form.

3. The kids bicycle balance training handle according to claim 2, wherein an angle between the lower extension section and the fixed section is 140°, an angle between the lower extension section and the upper extension section is 140°, and an angle between the upper extension section and the sleeved section is 110°.

4. The kids bicycle balance training handle according to claim 2, wherein an axial length of the upper extension section is greater than an axial length of the lower extension section, and an axial length of the sleeved section is greater than an axial length of the fixed section.

5. The kids bicycle balance training handle according to claim 2, wherein the fixed section and the upper extension section are arranged in parallel and spaced apart.

6. The kids bicycle balance training handle according to claim 1, wherein the handle bar is made of chrome molybdenum steel in an integral form.

7. The kids bicycle balance training handle according to claim 1, wherein the seat-post clamp portion comprises a seat fixing fastener and a seat swing fastener, the seat swing fastener is moved toward or away from the seat fixing fastener, and a seat-post bolt is configured to be inserted through the seat fixing fastener and the seat swing fastener to be threadedly connected to a seat-post nut, so that the seat fixing fastener and the seat swing fastener are clamped on and fixed to an outer surface of the seat post.

8. The kids bicycle balance training handle according to claim 7, wherein a soft gasket is disposed on inner sides of the seat fixing fastener and the seat swing fastener.

9. The kids bicycle balance training handle according to claim 1, wherein the handle bar comprises a lower part, an upper part, and an embedded part; the lower part comprises an insertion section, and the insertion section is axially provided with an inner hole; the upper part comprises a receiving hole for sleeving and fixing the insertion section; and the embedded part is partially disposed in the inner hole, and the embedded pan is partially disposed in the receiving hole.

10. The kids bicycle balance training handle according to claim 9, wherein the fixed section is located in the lower part, and the sleeved section is located in the upper part.

11. The kids bicycle balance training handle according to claim 10, wherein the sleeved section comprises multiple bent sections and is hook-shaped.

12. The kids bicycle balance training handle according to claim 9, further comprising a lateral bolt, wherein the lateral bolt is inserted through an upper lateral hole of the upper part, a lower lateral hole of the lower part, and an inner lateral hole of the embedded part to fix the upper part, the lower part, and the embedded part.

\* \* \* \* \*